(12) United States Patent
Noel et al.

(10) Patent No.: US 7,331,614 B2
(45) Date of Patent: Feb. 19, 2008

(54) TUBULAR THREADED JOINT WITH TRAPEZOID THREADS HAVING CONVEX BULGED THREAD SURFACE

(75) Inventors: Thierry Noel, Sebourg (FR); Gabriel Roussie, Mons en Baroeul (FR); Emmanuel Varenne, Villefranche-sur-Saone (FR)

(73) Assignees: Vallourec Mannesmann Oil & Gas France, Aulnoye-Aymeries (FR); Sumitomo Metal Industries, Ltd., Osaka-shi (JP)

( * ) Notice: Subject to any disclaimer, the term of this patent is extended or adjusted under 35 U.S.C. 154(b) by 0 days.

(21) Appl. No.: 10/470,734

(22) PCT Filed: Feb. 4, 2002

(86) PCT No.: PCT/FR02/00420

§ 371 (c)(1),
(2), (4) Date: Aug. 8, 2003

(87) PCT Pub. No.: WO02/065012

PCT Pub. Date: Aug. 22, 2002

(65) Prior Publication Data

US 2004/0195835 A1    Oct. 7, 2004

(30) Foreign Application Priority Data

Feb. 9, 2001    (FR) .................................. 01 01793

(51) Int. Cl.
*F16L 25/00*    (2006.01)
(52) U.S. Cl. ..................................................... 285/334
(58) Field of Classification Search ............... 285/334, 285/333
See application file for complete search history.

(56) References Cited

U.S. PATENT DOCUMENTS 2,681,815 A    6/1954    McCarn (Continued)

FOREIGN PATENT DOCUMENTS

GB    777901    6/1957

(Continued)

OTHER PUBLICATIONS

"Specification for Threading, Gauging, and Thread Inspection of Casing, and Line Pipe Threads (U.S. Customary Units)", American Petroleum Institute (API Specification Standard, 5B 14th Edition, Aug. 1996, Effective Date: Dec. 1, 1996: Issued: Apr. 9, 1998; (4 pp.).

*Primary Examiner*—David Bochna
(74) *Attorney, Agent, or Firm*—Oblon, Spivak, McClelland, Maier & Neustadt, P.C.

(57) ABSTRACT

A threaded tubular connection includes two elements, male and female, made up one into the other to a given torque in which, prior to making up, at least one thread face under contact pressure has a convexly rounded shape that is continuous over its width with a radius of curvature in the range 2 to 60 mm and is in point contact with the corresponding face of the mating element. Such a threaded connection has an increased resistance to breakout or to overtorquing. In one embodiment, the convexly rounded face is a male or female thread flank and one of the male or female threads includes a groove opening into the thread crest to render flexible either the convexly rounded flank or the corresponding flank. Such a geometry can accommodate variations in contact between the flanks.

34 Claims, 12 Drawing Sheets

U.S. PATENT DOCUMENTS

| | | | |
|---|---|---|---|
| 4,549,754 A * | 10/1985 | Saunders et al. | 285/334 |
| 5,681,059 A * | 10/1997 | Mackie | 285/334 |
| 6,349,979 B1 | 2/2002 | Noel et al. | |
| 6,412,831 B1 * | 7/2002 | Noel et al. | 285/334 |
| 6,481,760 B1 | 11/2002 | Noel et al. | |
| 6,543,816 B1 | 4/2003 | Noel | |

FOREIGN PATENT DOCUMENTS

| | | |
|---|---|---|
| GB | 2 074 685 | 11/1981 |
| WO | 00 14442 | 3/2000 |

* cited by examiner

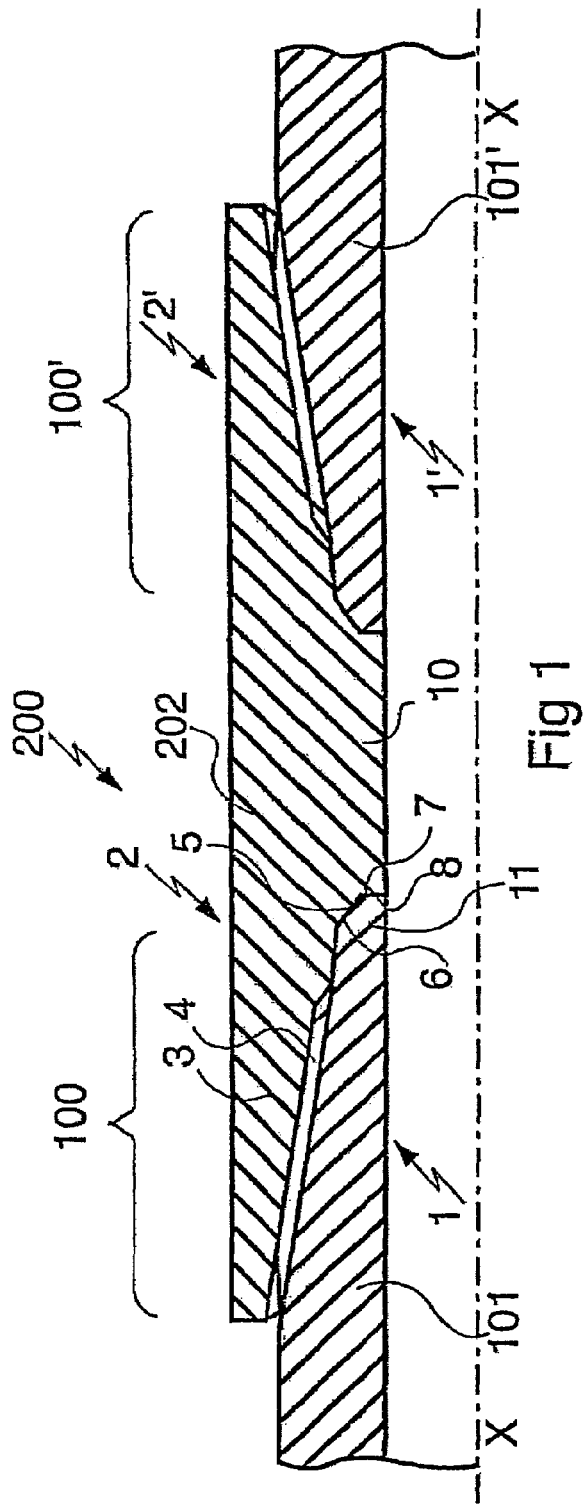
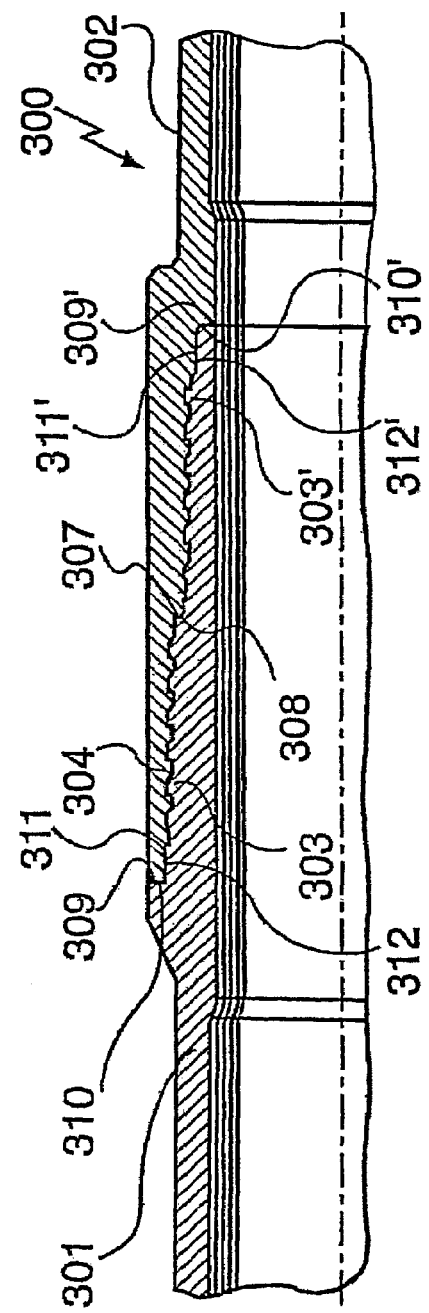

TUBULAR THREADED JOINT WITH TRAPEZOID THREADS HAVING CONVEX BULGED THREAD SURFACE

BACKGROUND OF THE INVENTION

1. Field of the Invention

The invention relates to threaded tubular connections.

2. Discussion of the Related Art

Threaded tubular connections can include a male threaded element and a female threaded element with trapezoidal threads located at the end of pipes to be connected; the threaded elements can be disposed as well as the end of great length pipes as at the end of short length pipes such as couplings.

Such threaded tubular connections are in particular used to constitute casing strings or tubing strings or drillpipe strings for hydrocarbon wells or for similar wells such as geothermal wells.

They have, for example, been defined in American Petroleum Institute (API) specifications API 5B and 5CT as tapered threadings with trapezoidal threads termed "buttress" threads.

The trapezoidal threads comprise a stabbing flank on the side of the threads directed towards the free end of the threaded element under consideration, a load flank on the side opposite the threads, a thread crest with a non zero width and a thread root also with a non zero width, the load flanks and the stabbing flanks being oriented substantially perpendicular to the axis of the threaded element (inclination at +3° for the load flanks, at +10° for the stabbing flanks for example in the case of the API Buttress threads).

Trapezoidal threads have thus been defined in the present document by opposition to other types of threads such as defined in the above mentioned API specifications, i.e. triangular or triangular rounded threads ("round") the load and stabbing flanks of which are highly inclined with respect to the normal to the axis of the threaded element (at 30° for example) and the thread crests and roots of which have a substantially zero width. Compared to the triangular or round trapezoidal threads present important advantages with respect to the unacceptable risk of jumping out.

API type threaded tubular connections with trapezoidal threads constitute the subject matter of a number of developments; in particular to improve their strength to the very wide variety of stresses resulting from the operating conditions (axial tension, axial compression, bending, torsion, internal or external pressure . . . ) and their tightness against fluids circulating inside or outside such connections under such stresses. These improvements have, for example, been described in the following documents: EP 0 488 912, EP 0 707 133, EP 0 454 147 and International patent application WO 00/14441.

Other types of threaded connections with trapezoidal threads described for example in patents U.S. Pat. No. 4,521,042 or U.S. Pat. No. 4,570,982 and designed for the same purpose use straight threadings, in particular two-step threadings.

Generally speaking the faces of the trapezoidal threads of the threaded connections of the prior art, i.e., the flanks of the threads and the crests and roots of the threads, appear rectilinear in axial cross section except for the junctions between the faces, which junctions generally have a junction radius or a chamfer; for this reason, such faces will be termed "rectilinear" in the present document.

In all those types of threaded tubular connections, when the threaded elements have been made up into each other, contact is developed with a contact pressure between at least one male thread face and the corresponding face of the female thread. Depending on the threading type, that contact pressure can be developed between mating thread crests and roots, between load flanks, between stabbing flanks or between a plurality of such faces.

Developing a contact pressure between corresponding trapezoidal thread faces (and possibly other surfaces such as sealing surfaces and transverse abutment surfaces disposed in a corresponding manner on the threaded elements) results from the necessity to make up the threaded connection with a substantial make-up torque.

Once the threaded connection is connected with a given makeup torque, it has been noted, in known threaded connections, that it is sufficient to apply a torque the absolute value of which is only slightly higher than the makeup torque to, depending on the direction of that torque, overtorque or breakout the threaded connection.

Overtorquing can in particular occur when a pipe string is rotated and descended to the bottom of a deviated or even horizontal hydrocarbon well and cause an offset in the relative positioning of the male and female elements, with the deleterious result of a risk of leakage of the threaded connections.

Accidental breakout in a well can have even more severe consequences.

SUMMARY OF THE INVENTION

The invention thus seeks to produce threaded tubular connections with trapezoidal threads which, once made up, require in order to go beyond their made up position or to break them out, substantially higher torques in absolute value than said make-up torque without the threaded tubular connections being sensitive to galling.

The invention also aims to avoid galling resulting from excessive contact pressures between corresponding thread faces, in particular between corresponding thread flanks.

In particular, the invention aims to avoid galling in the case of threadings with axial interference or with wedge threads as respectively described, for example, in patent applications WO 00/14441 and WO 94/29627 where an interference contact is produced both between the load flanks and the stabbing flanks of the threads, the contact pressures developed between the flanks in interference contact being very sensitive to the effective geometry of male and female threads and thus to their being matched.

This means that the threadings must be machined with a high degree of precision, and thus at a high cost. The invention also seeks to provide threaded tubular connections with wedge threads or threads with an axial interference fit that can be machined with normal dimensional tolerances, for example of the order of 0.01 mm.

The threaded tubular connection of the invention comprises a male threaded element at the end of a first pipe and a female threaded element at the end of a second pipe.

The male threaded element comprises an external male threading with trapezoidal threads over substantially the whole length of the threading and the female threaded element comprises an internal female threading that mates with the male threading, i.e., has a shape and disposition suitable for their make-up. The male and female threaded elements are made up one inside the other with a given make-up torque such that at least one male thread face is in contact pressure with the corresponding face of the female threading.

The term "threading" as used means a threading with one or several threaded portions. In this last case, the threads are trapezoidal over substantially the whole length of each of the threaded portions.

Before make-up, at least one thread face of a threading in contact pressure exhibits a continuous convexly rounded shape over the width of the face under consideration and is in point contact with the corresponding face of the mating threading.

The term "convexly rounded face" as used in the present document means a thread face which is curvilinear and convex in axial cross section. Similarly, the term "concavely rounded face" and "rectilinear face" means faces that appear as such in axial cross section (except for the position of the junctions between the adjacent faces).

The term "width" of the face as used in the present document means the dimension of the face viewed in axial cross section. The term "width" of a face thus means the essentially axial dimension of the thread crests or roots and the essential radial dimension of the thread flanks.

The term "trapezoidal thread" corresponds to the general definition above given even if some of the faces are not rectilinear in the case of the present invention. It includes trapezoidal threads with angles of load flanks and stabbing flanks as well positive as negative or equal to zero (square threads, hook-type threads, semi-dovetail type threads or dovetail type threads) the sign convention being shown in the embodiments described further on in the text.

A convexly rounded face as defined creates a contact with the corresponding face of the mating threading which, in a cross section passing through the axis of the connection, appears to be a point contact or substantially point contact provided, of course, that the radii of curvature of the corresponding faces are suitable.

The contact pressure resulting from said point contact is a maximum at the contact point and decreases on either side of this point more or less rapidly depending on the difference in the radius of curvature of the two faces in contact and the elastic characteristics of the materials in contact.

The curvature of the convexly rounded face is selected so that the threaded connection of the invention, once made up to a given make-up torque compared with a conventional threaded connection where all of the male and female thread faces are rectilinear, has a substantially increased resistance to breakout or overtorquing.

Surprisingly, a torque the absolute value of which is substantially higher than that of the make-up torque must be applied; on average, the torque must be higher than the make-up torque by at least 5%, to overtorque or break out, depending on the torque direction, the threaded connection of the invention once made up to the specified make-up torque. A priori, the opposite effect would have been expected, i.e., an improved behaviour to breakout/overtorquing for the threaded connection with rectilinear thread faces which a priori has larger frictional surfaces.

Further, taking into account the loads to which the threaded tubular connection thread faces are subjected, in particular in the case of threaded tubular connections developed for exploiting hydrocarbon wells which have small thread widths and heights, the skilled person would not until now have been tempted to establish point contacts, i.e., not distributed over the corresponding faces under contact pressure.

The curvature of said convexly rounded face is also adapted to the geometry of the corresponding face in contact, so that the maximum pressure does not lead to plastication of the material of the faces in point contact.

Advantageously, said convexly rounded face has, over its width except for the junctions with the adjacent faces, one or more radii of curvature in the range 2 to 60 mm and preferably in the range 3 to 20 mm.

Said convexly rounded face can be formed over all or a portion of the length of the threading under consideration, but it is preferably formed over the entire length of the threading under consideration and consequently over the whole length of each of the threaded portions when the threading comprises several threaded portions.

Preferably, said convexly rounded face has a uniform curvature over the width of the face under consideration except for the junctions with the adjacent faces.

Preferably again, said convexly rounded face has a uniform curvature over the entire length of the threading.

Preferably again, a convexly rounded face corresponds with a rectilinear face on the mating threading.

Very preferably, only one convexly rounded face is disposed on a single, male or female, threading.

In a preferred embodiment of the invention, the male and female threadings of the threaded connection are tapered with threads which radially interfere with each other and said convexly rounded face is a thread crest.

In a further preferred embodiment of the invention, said convexly rounded face is a male or female thread flank and one or other of the threads, male or female, comprises a means for rendering flexible the convexly rounded flank or the corresponding flank thereto on the mated threading.

Preferably, the convexly rounded flank is a load flank.

In a variation of this second embodiment, the convexly rounded flank is a stabbing flank.

Bending of the flank thus qualified as flexible in the remainder of the present document increases with contact pressure during or at the end of make-up and can in particular allow the threads to adapt to differences in dimensional sizes of the male and female threadings compared with the nominal size without generating excessive contact pressure.

Preferably, in this second embodiment of the invention, said means for rendering flexible the convexly rounded flank or the corresponding flank thereto is a groove disposed at the crest of the thread adjacent to the flexible flank.

Bending of the portion of the thread between the groove and the flexible flank during contact under contact pressure induces, in an axial cross sectional representation, rotation of the flexible flank about a centre of rotation located at the foot of the flexible flank.

Preferably, the depth of the groove is less than or equal to the height of the thread in which it is formed.

Preferably again, the width of the opening of the groove is less than or equal to ⅔ of the width of the thread in which it is formed, the thread width being measured at the mid-height thereof.

Preferably again, the bottom of the groove is rounded with a radius of 0.2 mm or more.

Advantageously in the case when the means for reducing the stiffness of a thread flank is a groove, the angle termed the "angle of the convexly rounded face" formed by the tangent to the convexly rounded face at the mid-height thereof and the normal to the axis of the connection is different from the angle termed the "angle of the corresponding flank" formed by the tangent to the corresponding flank to the convexly rounded flank, also taken at the mid-height of said corresponding flank and the normal to the axis of the connection.

Such a difference between these angles causes a displacement of the point of contact between the convexly rounded flank and the corresponding flank along these flanks during bending of the flexible flank at the end of make-up or as a function of axial service stresses.

Such a displacement of the point of contact prevents constant stressing of the same point of the convexly rounded flank and of the corresponding flank, which tends to reduce the risks of galling of these flanks after several make-up-breakout actions.

Very advantageously in this case, the values of the angle of the convexly rounded flank and of the corresponding flank angle are such that the first contact between the convexly rounded flank and the corresponding flank takes place on the flexible flank on the side of the thread crest where the groove is located.

Very advantageously again, the sign of the algebraic value of the offset between the angle of the convexly rounded flank and the angle of the corresponding flank is such that the point of contact between the convexly rounded flank and the corresponding flank is displaced during makeup towards the centre of rotation of the flexible flank.

Very advantageously again, the value of the offset between the angle of the convexly rounded flank and the corresponding flank angle is such that the final point of contact between the convexly rounded flank and the corresponding flank once the threaded connection has been completely made up is located outside the quarter of the width of the convexly rounded flank located at the end thereof on the thread root side.

Such a disposition enables to prevent excessive and deleterious concentrations of stresses at the root of the thread.

The values of the angle of the convexly rounded flank and of the angle of the corresponding flank to obtain such technical effects can be determined by calculation or by tests, as will be seen in the embodiments described below.

Preferably, the absolute value of the difference between the angle of the convexly rounded flank and the angle of the corresponding flank is in the range 1° to 5°.

Preferably, on the threaded connection of the invention, each male and female element comprises at least one sealing surface, each male sealing surface radially interfering with a corresponding female sealing surface on the threaded tubular connection in the made up position.

Preferably again, in the threaded connection of the invention, each male and female element constitutes at least one annular transverse abutment surface, at least one male abutment surface bearing against a corresponding female abutment surface on the threaded connection in the made up position.

BRIEF DESCRIPTION OF THE DRAWINGS

The figures below show in a non-limiting and diagrammatic representation different embodiments and the use of the threaded tubular connections of the invention.

FIG. 1 shows a threaded and coupled connection comprising two threaded connections with tapered threadings and trapezoidal threads.

FIG. 2 shows an integral threaded connection comprising a threaded connection with two-step straight threadings and trapezoidal threads.

FIG. 3 shows a few trapezoidal threads of a threaded connection of the invention of the type shown in FIG. 1 in which the crests of the female threads are convexly rounded.

FIGS. 4 to 6 each comprise 4 sub-figures shown by letters A to D: the letter A represents the female threading alone while letter B represents the male threading alone. Letter C represents elements A and B during make-up at the point where the corresponding faces come into contact. Letter D relates to the completed connection of the elements shown in A and B.

FIGS. 1 to 6 are not to scale; the characteristics of the threaded connections have been exaggerated to better enhance them or to better explain their functioning.

DETAILED DESCRIPTION

Figure 3A:
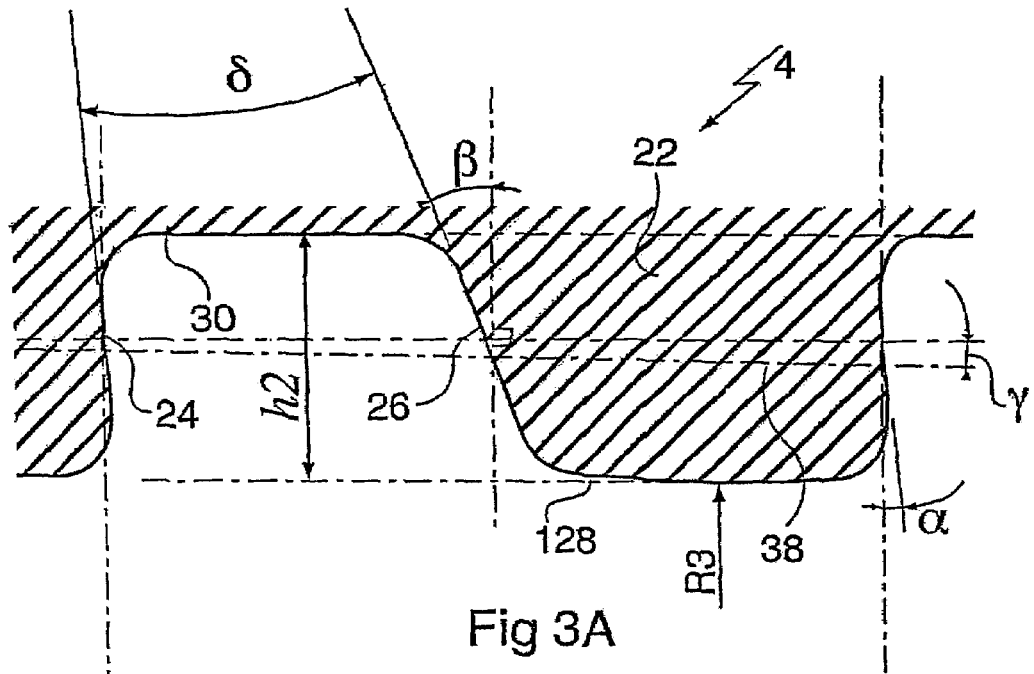
FIG. 3A shows a female threading alone.

FIG. 1 shows a threaded and coupled connection 200 between two great length pipes 101, 101'.

The term "great length pipe" means pipes several metres long, for example about 10 m long.

Such pipes are usually connected to constitute casing strings or tubing strings for hydrocarbon wells or drillpipe strings for the same wells.

The pipes can be formed from any non alloyed, light alloyed or heavy alloyed steel, or even ferrous or non ferrous alloys to adapt them to the different working conditions: amount of mechanical stress, corrosive nature of fluid inside or outside the pipes.

It is also possible to use steel pipes that have low corrosion resistance provided with a coating, for example of a synthetic material that prevents any contact between the steel and the corrosive fluid.

The ends of pipes 101, 101' are provided with identical male threaded elements 1, 1' and are connected via a coupling 202 each end of which is provided with a female threaded element 2, 2'.

The male threaded elements 1, 1' are respectively connected by making up into the female threaded elements 2, 2' by constituting two symmetrical threaded connections 100, 100' joined by a projection 10 several centimetres long.

The internal diameter of the projection 10 of the coupling is substantially identical to that of pipes 101, 101' such that fluid flow inside the pipes is not disturbed.

Threaded connections 100, 100' being symmetrical, the function of only one of these connections will be described.

Male threaded element 1 comprises a male threading 3 with trapezoidal threads derived from the "Buttress" type thread as defined in specification API 5B; this male threading 3 is tapered and disposed on the exterior of the male element and is separated from the free end 7 of said element by a non-threaded lip 11. The free end 7 is a substantially transverse annular abutment surface.

Next to the free end 7 on the external surface of the lip 11 is a tapered bearing surface 5 the taper of which is higher than that of the male threading 3.

The female element 2 comprises means that mate with those of the male element 1, i.e., they have a corresponding shape and are intended to cooperate with the male means because of their disposition.

Female element 2 thus comprises internally a tapered female threading 4 and a non-threaded portion between the threading and the projection 10.

This non-threaded portion comprises in particular a substantially transverse annular abutment surface 8 forming a shoulder at the end of the projection and a tapered bearing surface 6 following the shoulder.

After complete make-up of the male threading in the female threading, the transverse abutment surfaces 7 and 8 bear against each other while the bearing surfaces 5, 6 radially interfere and are thus under metal-metal contact pressure. The bearing surfaces 5, 6 thus constitute sealing surfaces that render the threaded connection tight even under high internal or external fluid pressures and under a variety of stresses (axial tension, axial compression, bending, torsion, etc . . . ).

It is also possible to integrate into the threadings a sealing ring of synthetic material such as a fluoropolymer to produce or reinforce the tightness.

A further example of a threaded connection between two great length pipes is shown in FIG. 2; this type of connection 300, using only a single threaded connection, is termed integral.

One end of pipe 301 is provided with a male threaded element 1; the second pipe 302 is provided with a female threaded element 2 at the corresponding end.

Male threaded element 1 comprises an external male threading constituted in the case of FIG. 2 by two straight steps 303, 303', with trapezoidal threads separated by a transverse annular surface 307 of a central shoulder forming an abutment, the step with the smallest diameter 303' being disposed at the free end 309' of the element, said free end 309' being an annular transverse surface.

Between threaded portion 303' and end surface 309' is an external tapered bearing surface 311'.

Opposite the male element, the threaded portion 303 is extended by a non-threaded portion comprising a tapered bearing surface 311 and a transverse annular surface 309 forming a shoulder.

The interior of female threaded element 2 comprises female means that mate with the male means.

Thus female element 2 comprises a female threading constituted by two straight steps 304, 304' separated by a transverse annular surface 308 of a central shoulder forming an abutment, the step with the largest diameter 304 being disposed near the transverse annular free end 310 of the female element.

Moreover the female element comprises two tapered bearing surfaces 312, 312' corresponding to the male bearing surfaces 311, 311 ' and a transverse annular surface 310' forming a shoulder at the end of the element opposite the free end 310.

When made up, the male threaded portions 303, 303' are made up respectively into the female threaded portions 304, 304' and the abutment surfaces of the central shoulders 307, 308 bear against each other. The transverse end surfaces 309, 309' are almost in contact with the respective shoulder surfaces 310, 310' and constitute auxiliary abutments for the central principal abutment 307, 308.

The male bearing surfaces 311, 311 ' radially interfere with the female bearing surfaces 312, 312' respectively by developing high metal-metal contact pressures that can ensure the seal of the connection against external or internal fluids.

In variations that are not shown, the threaded and coupled connection can have straight threadings and the integral connection may have tapered threadings.

The threadings can also each have two tapered threaded portions with similar or different tapers or be straight-tapered; the threaded portions of a single threading may or may not be stepped.

In FIGS. 1 and 2, the threadings are diagrammatically depicted by generatrices or envelopes of the thread crests and thread roots.

The following figures enable to describe the threads of threaded connections in several variations of the invention.

FIG. 3 concerns tapered threadings with radially interfering trapezoidal threads and with convexly rounded thread crests of a threaded connection 100 of FIG. 1.

Figure 3B:
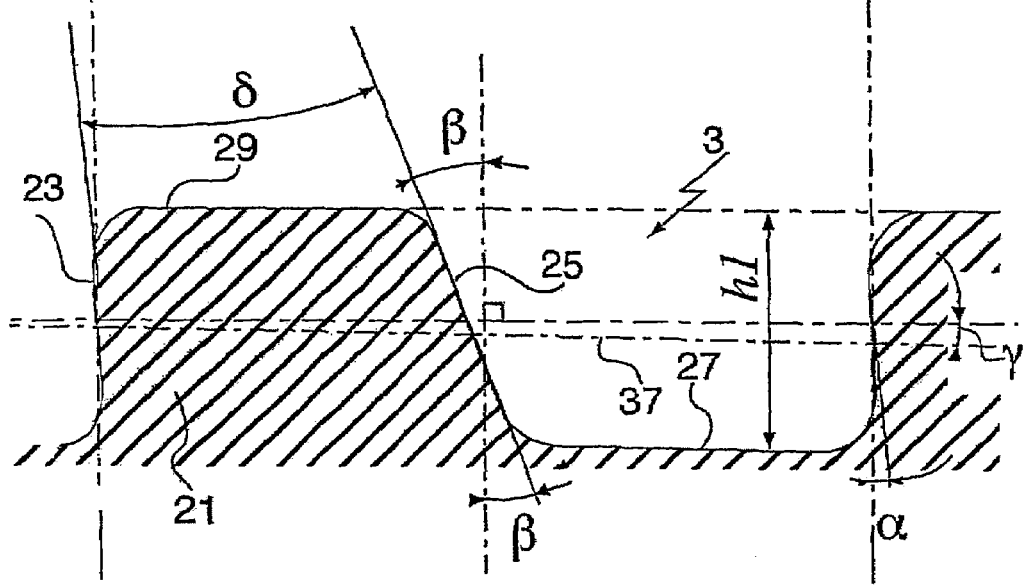
FIG. 3B shows a male threading alone.

FIG. 3B shows the male threads 21 of this type of threaded connection which have a conventional trapezoidal shape in axial cross section and which comprise a load flank 23, a stabbing flank 25, a thread crest 29 and a thread root 27. The height is h1 and the mid-height width is 2.5 mm (5 threads per inch).

The thread crests and roots are disposed on tapered surfaces with the same taper defined by a peak half-angle $\gamma$ between the "primitive" cone symbolised by its generatrix 37 and the direction of the axis of the connection.

The thread crests 29 and thread roots 27 are rectilinear except at the level of the junctions with the flanks; in known manner, these junctions have a radius of the order of a fraction of a mm to limit stress concentrations at the thread roots and brittleness of the edges; the thread crests 29 and thread roots 27 are disposed on tapered surfaces with a peak half angle $\gamma$.

The load flanks 23 and stabbing flanks 25 are also rectilinear and respectively form an angle $\alpha$ and $\beta$ with the normal to the axis of the connection.

In the present case, $\alpha$ is slightly negative (flank 23 slightly overhangs thread root 27) while angle $\beta$ is positive and more inclined.

It follows that the flanks form between them an angle $\delta$ such that the trapezoidal threads 21 are less wide at their crest 29 than at their base.

The female threads are shown in FIG. 3A.

They are substantially trapezoidal in shape and adapted to be made up with the male threads 21. Their height h2 is slightly higher than that h1 of male threads 21 and their mid-height width is 2.5 mm (5 threads per inch).

The female thread crests 128 and female thread roots 30 are tangential to or are disposed on tapered surfaces with a peak half-angle $\gamma$ identical to that relating to the female threads.

Female thread roots 30 are rectilinear except for the junctions with the flanks which, like the male threads, have a junction radius.

Female thread crests 128 are continuously convexly rounded over their entire length, i.e., there is no discontinuity over their width.

They have a radius R3 equal to 5 mm (except for the junctions with the flanks which have a smaller junction radius adapted to the connection radius of the male threads).

The load flanks 24 and stabbing flanks 26 respectively form the same angles α and β with the normal to the axis of the connection as the corresponding flanks 23, 25 of the male threading.

Figure 3C:
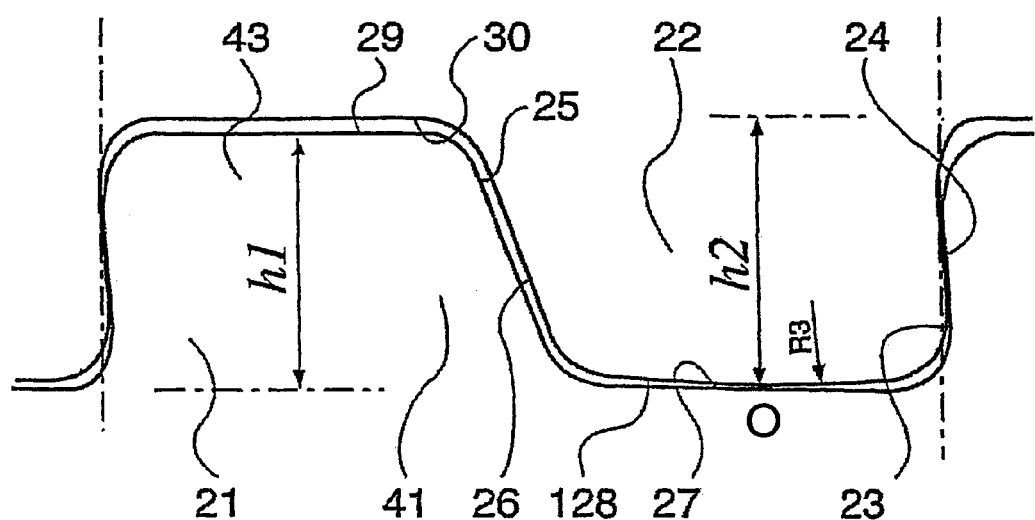
FIG. 3C shows a completed connection of elements of FIGS. 3A and 3B.

When the male threading 3 is made up into the female threading 4, at a given moment a contact occurs between the convexly rounded female thread crest 128 and the male thread root 27 as one has provided geometrically (h2>h1), for a clearance to subsist between the male thread crest 29 and the female thread root 30 which are both rectilinear: see FIG. 3C.

Taking into account the presence of abutments 7, 8 (see FIG. 1) which bear against each other once the threaded connection is made up, the male and female elements are in axial tension, which means that the load flanks 23, 24 are under contact pressure. On the contrary, there is a clearance between the male and female stabbing flanks 25, 26.

Interfering contact between the convexly rounded female thread crest 128 and the male thread root 27 occurs at a point O, which is substantially at the centre of the rounded crest 128 and the rectilinear root 27.

The curvature of the convexly rounded female thread crest 128 enables to increase the resistance to breakout or overtorquing of the threaded connection of the invention.

Figures 7A, 7B:
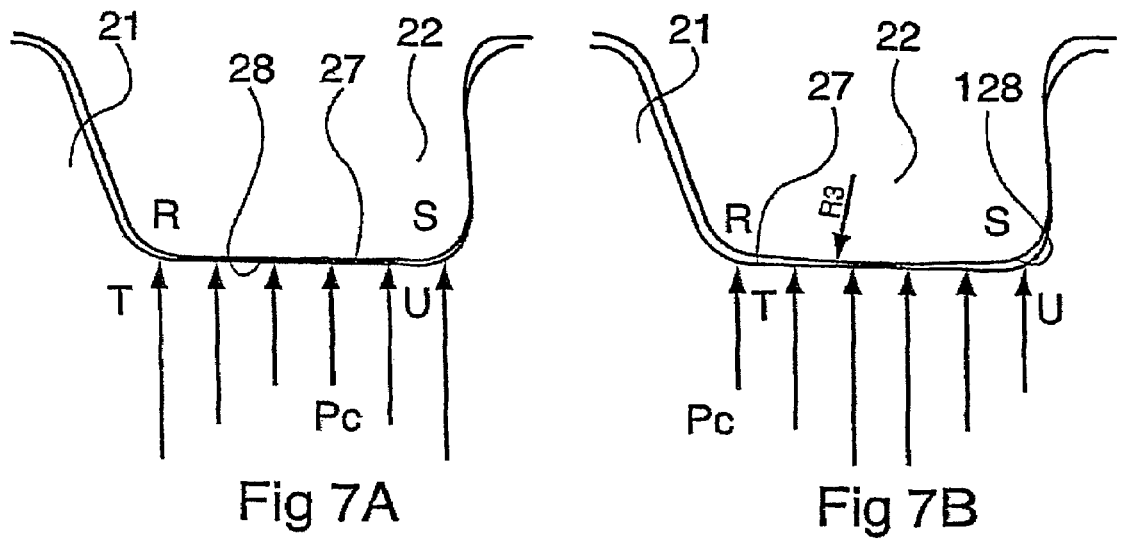
FIG. 7 shows the distribution of the contact pressures between the male crest and the female root of the interfering trapezoidal threads, FIG. 7A relating to contact between the rectilinear crest and root of a prior art threaded connection and FIG. 7B to the contact between a rectilinear root and the convexly rounded crest of FIG. 3C.

FIG. 7A diagrammatically shows the distribution of contact pressures on a prior art threaded connection between a female thread crest 28 with a rectilinear shape and a male thread root 27, also rectilinear in shape.

Arrows PC give a measure of the local contact pressure at each distributed contact point; it can be seen that the values of the contact pressure $P_c$ are higher at each end R, S, T, U of the segments in contact.

It follows that grease introduced to lubricate the threadings and prevent galling tends to become trapped inside the contact segment.

Once make-up has been completed to a given torque $T_f$, for a prior art threaded connection, a torque $T_s$ with a value slightly higher than $T_f$ can be exerted to resume make-up taking into account the lubricant trapped in the contact segments. This results in a relative displacement of the male and female elements and an unsuitable positioning of the sealing means.

Recent techniques for drilling deviated oblique wells or even horizontal wells require rotating the pipes and threaded connections connecting them during their descent in the well and thus subjecting the threaded connections to a high torque. It is imperative that such rotation does not lead to leaks in service.

Similarly, to break out a threaded connection, a torque $T_b$ in the opposite direction to $T_f$ must be exerted but this torque is on a prior art threaded connection with an absolute value identical to the make-up torque $T_f$.

FIG. 7B shows that a slight curvature of the female thread crests 128 can eliminate median contact pressure hollow and thus trapping of the lubricant between the female thread crests 128 and the interfering male thread roots 27 by creating a median contact pressure peak.

Thus a torque T that is substantially higher than $T_f$ in absolute value has to be exerted to overtorque or break out the threaded connection.

Makeup-breakout tests were carried out on VAM TOP® type threaded connections (VAM® catalogue n° 940, July 1994 from Vallourec Oil & Gas), modified according to FIG. 3 and with the following characteristics:
low alloy steel pipes treated for grade L80 API (yield strength 552 MPa or more);
external pipe diameter: 177.8 mm (7");
pipe thickness: 10.36 mm (29 lb/ft);
5 threads per inch threading;
threading taper=6.25% (γ=1.79°).

The values of the breakout torque $T_b$ for making up to a torque $T_f$ were measured for 4 different threaded connections and for different levels of make-up torques.

For the 11 makeup-breakout tests carried out, the relative difference between the absolute values of $T_f$ and $T_b$ varies between 3% and 14%, with a mean of 7.5%.

Selecting too low a radius of curvature R3 leads to too acute a median contact pressure peak and as a result a risk of plastication of the material and/or galling of the threads after using the threaded connections several times; it also induces a reduction in the width of the load flanks 23, 24 and thus in the maximum acceptable axial tensile load: a radius of curvature R3 of 2 mm or more is quite suitable.

Choosing too high a radius of curvature R3 no longer produces the anticipated effect and thus leads to a risk of the lubricant becoming trapped: a radius of curvature R3 of 60 mm or less, preferably 20 mm, is suitable.

The advantageous characteristic of resistance to breakout or overtorquing of the threaded connection of the invention could also be improved by further producing a slightly convexly rounded male or female load flank so as to avoid any grease becoming trapped in the middle of the load flanks.

FIG. 4 relates to tapered threadings with axially interfering trapezoidal threads of a threaded connection 100 of FIG. 1.

The term "axially interfering trapezoidal threads" means the threads described in WO 00/14441 in which the mid-height thread width is larger than the mid-height width of the spaces between the corresponding threads of the mating threading, which induces an axial interference fit of the two thread flanks of one threading by those of the mating threading, and vice versa.

Figure 4A:
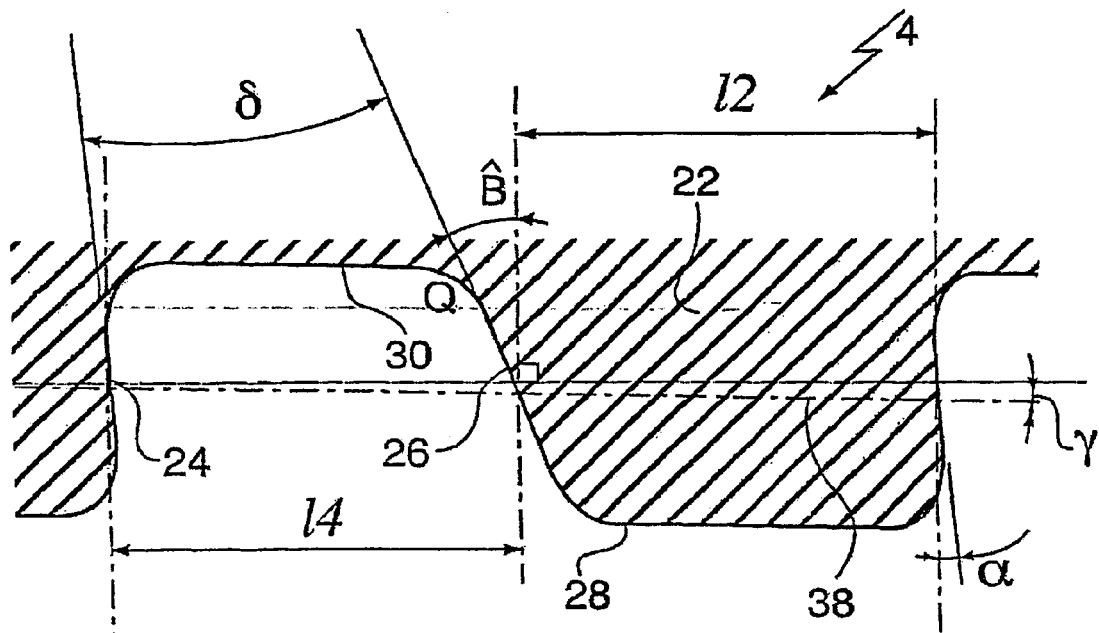
FIG. 4 shows a few threads of a further threaded connection of the invention, the threaded connection being of the type shown in FIG. 1 with axially interfering trapezoidal threads the male stabbing flank of which is convexly rounded.
Figure 4B:
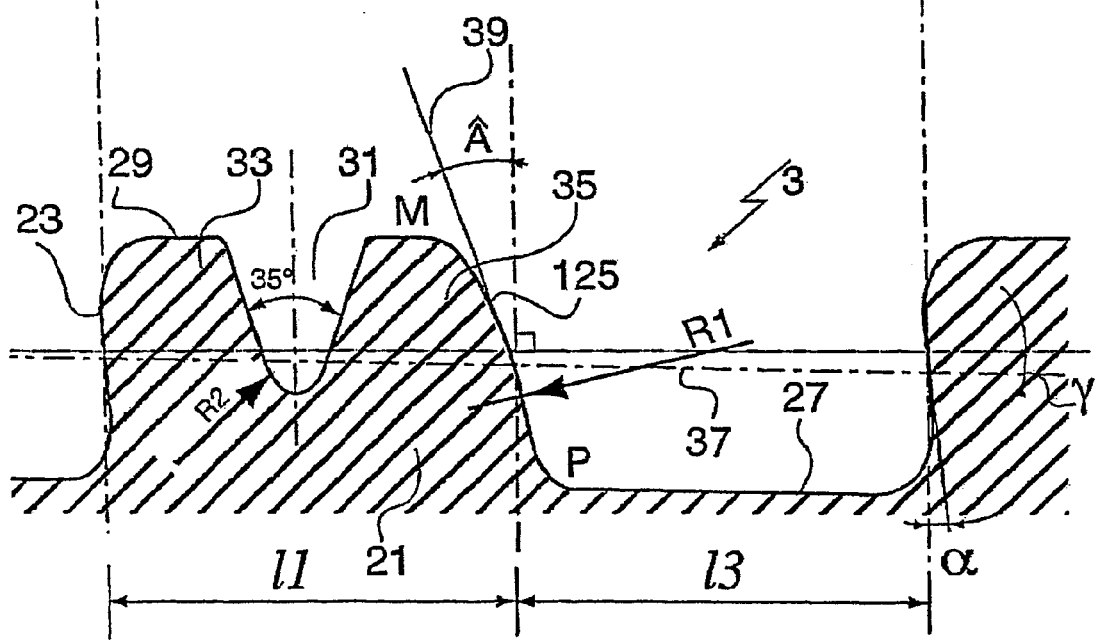

FIG. 4B shows several male threads 21 with a substantially trapezoidal shape in axial cross section and which comprise a load flank 23, a stabbing flank 125, a thread crest 29 and a thread root 27.

The thread crests and roots are rectilinear (except for the junctions with the flanks which have a radius of the order of a fraction of a mm to limit stress concentrations at the thread roots and brittleness of the edges) and are disposed on tapered surfaces with the same taper defined by the peak half-angle γ between the "primitive" cone symbolised by its generatrix 37 and the direction of the connection axis.

The threads have over their entire length a helical groove 31 the profile of which has an axis substantially normal to that of the connection which opens into the thread crest at about its mid-width.

Groove 31 has a rounded bottom V profile; the angle between the branches of the V is of the order of 35° and the radius at the bottom of groove 61 is 0.4 mm.

Its width at its opening is of the order of 35% of the width of the thread crest 29 and its depth is of the order of 60% of the height of thread 21.

The load flank 23 is rectilinear (except for the junctions with the thread crests and roots as indicated above) and slightly overhangs the thread root, the angle α of this load flank with respect to the normal to the axis of the connection being very slightly negative, equal to −3°.

The stabbing flank 125 which is adjacent to thread crest 29 is convexly rounded over the whole of its width MP; it has a uniform radius of curvature R1 of a few mm except for the junctions with the thread crests and roots where the radius of curvature is lower, of the order of a fraction of a mm.

The tangent 39 to the stabbing flank taken at the mid-height of the thread makes an angle A with the normal to the axis of the connection.

The width of the thread taken at the mid-height of the thread is l1 while l3 represents the space between the thread teeth at the mid-height, the sum (l1+l3) being equal to the pitch of the thread.

FIG. 4A shows a few female trapezoidal threads 22 with a shape adapted to that of the male threads 21.

Female threads 22 have 4 rectilinear faces (except for the junctions with the thread crests and roots which, in known manner, have a radius of the order of a fraction of a mm to limit the stress concentrations in the thread roots and the brittleness of the edges), namely:

- a load flank 24 that overhangs the thread root 30 and is inclined at an angle α with respect to the normal to the axis of the connection, this angle α being identical to the angle of the male load flank;
- a stabbing flank 26 that is inclined at an angle B with respect to the normal to the axis of the connection, angle B being slightly higher than angle A of FIG. 4B;
- a thread crest 28 disposed on a tapered surface with a peak half-angle γ identical to that of the corresponding tapered surface on the male threading;
- a thread root 30 also disposed on a tapered surface with a peak half-angle γ.

The angles α and B are different, their difference δ being such that the threads 22 are narrower at their crest 28 than at their base.

l2 represents the width of the female thread at mid-height while l4 represents the space between the teeth of the female thread at mid-height: the sum (l2+l4) represents the pitch of the female thread, which is identical to that of the male thread.

In the configuration of the thread connection of FIG. 4, l1 is greater than l4 and l2 is greater than l3, with the result that, during make-up, the two male flanks 23, 125 will, at a given moment depending on the taper of the threadings, come into contact with the two female flanks 24, 26; on continuing make-up the threads 21, 22 will be subjected to an axial interference, hence the description "axial interference threads" given to this type of thread.

Figure 4C:
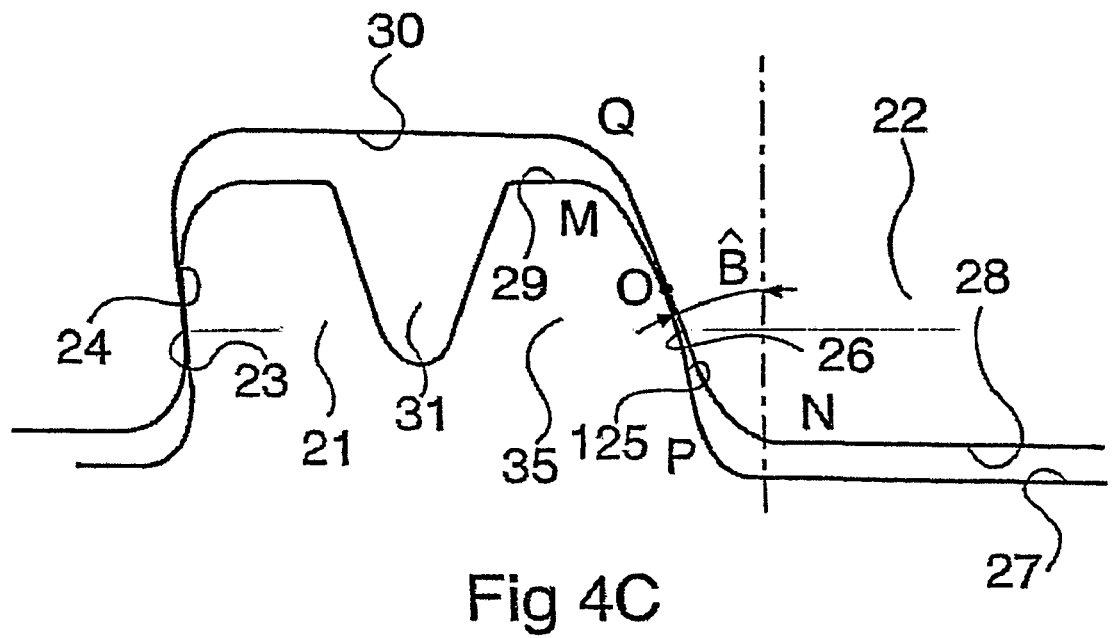

FIG. 4C shows the position of male threads 21 and female threads 22 at the moment of first contact during make-up.

Rectilinear load flanks 23, 24 with angle α are in contact, distributed over their common width.

Thread crests 29, 28 are still spaced from the corresponding thread roots 30, 27.

Stabbing flanks 125, 26 are in contact at point O which is located on arc MP closer to M than to P on the male flank 125 and also closer to Q than to N on female flank 26. The contact has thus taken place on the side of the male thread crest where groove 31 is positioned.

Contact offset towards M results from the fact that angle A of tangent 39 to convexly rounded flank 125 at the thread mid-height is less than the constant angle B of rectilinear female flank 26, point O corresponding to the point where the tangent to the convexly rounded flank 125 makes an angle B with respect to the normal to the axis of the connection.

When make-up is continued beyond the position shown in FIG. 4C, because of the tapered threadings, the male threads tend to wedge themselves into the hollows between the female threads and conversely, the female threads wedge themselves into the hollows between the male threads, generating an interfering contact pressure between the corresponding flanks. This contact pressure increases when make-up is continued because of the trapezoidal shape of the threads and the taper of the threadings.

In the absence of a groove on conventional male and female trapezoidal threads, because the threads are produced from a steel type material with a high modulus of elasticity, the two flanks very rapidly form an extremely rigid abutment and make-up can no longer be continued.

This would not be a serious drawback if the geometry of the threads was perfectly reproducible, which is not the case.

Normal machining tolerances of ±0.01 mm on the widths of the male and female threads are susceptible of leading to a difference of 0.02 mm in the axial interference or tightening equal to (l1-l4) or (l2-l3).

Because of the taper of the threadings, this difference results in unacceptable differences in positioning of the male threaded element/female threaded element and in particular it induces differences in radial interference at the level of the sealing surfaces 5, 6, and thus unacceptable risks of in-service leaks.

Groove 31 that opens into thread crest 29 adjacent to the convexly rounded stabbing flank 125 enables both portions 33, 35 of the male thread 21 to deform by bending under the interfering contact pressure resulting from continued make-up beyond the first contact: groove 31 thus enables to render the structure of the male thread 21 more flexible and to reduce the stiffness of stabbing flank 125.

Deformation of the two portions 33, 35 of the male thread is proportional to the contact pressure, given that the material of the male thread 21 is worked in its elastic region, the solid female thread 22 being considered to be rigid to a first approximation and the stiffness of the spring constituted by the portion of thread 35 between groove 31 and the flexible stabbing flank being determined by the geometry of this thread portion 35 and by the elasticity of the material, for example steel, constituting it.

The curvature of the male convexly rounded stabbing flank 125 enables the groove to be worked optimally: in the absence of such a curvature, i.e., if the stabbing flank were rectilinear with an angle equal to B, portions 33, 35 of the tooth of the male thread would be closer by translation, which would lead to a substantial reduction in the radius R2 at the bottom of the groove and a risk of shearing of the root of the thread portions 33, 35.

In contrast, the curvature of the male stabbing flank 125 allows gradual rotation of the convexly rounded stabbing flank 125 thus rendered flexible during continued make-up and the distribution of contact pressures in accordance with the Hertz theory.

The centre of rotation of the flexible stabbing flank 125 is substantially located at P, at the root of the flexible stabbing flank 125.

Figure 4D:
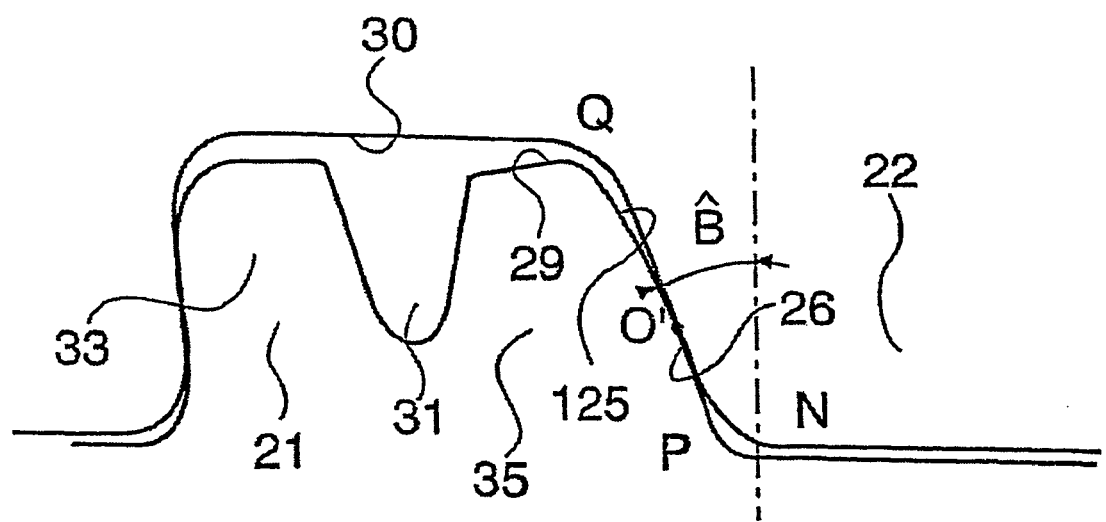
Figure 5A:
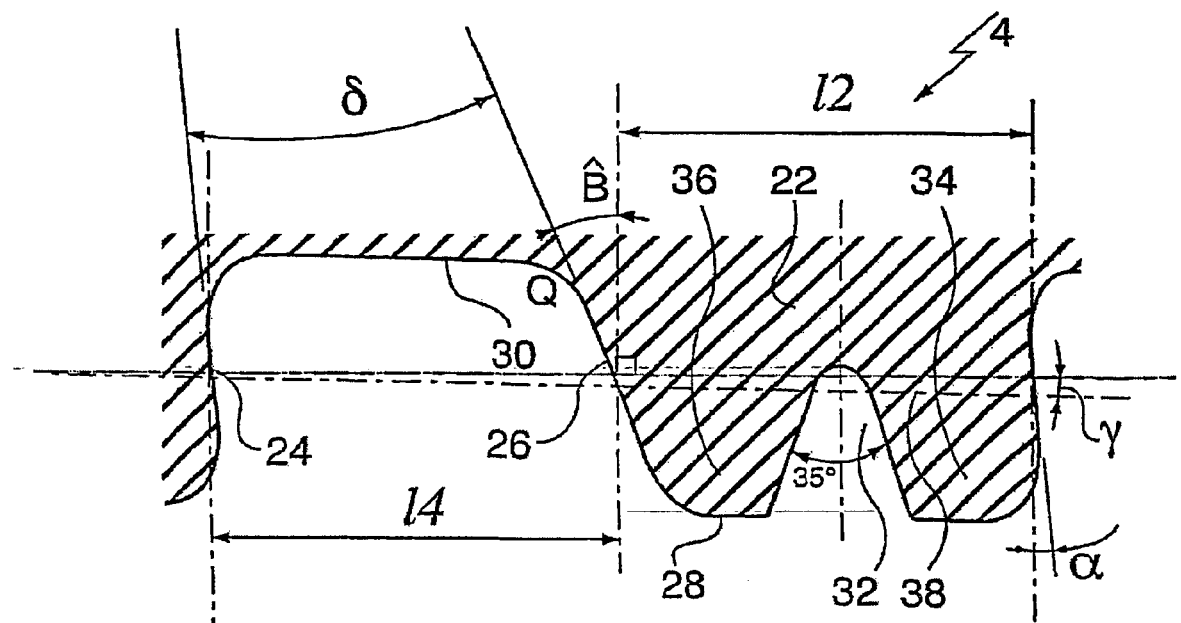
FIG. 5 is a variation of the threaded connection of FIG. 4.
Figure 5B:
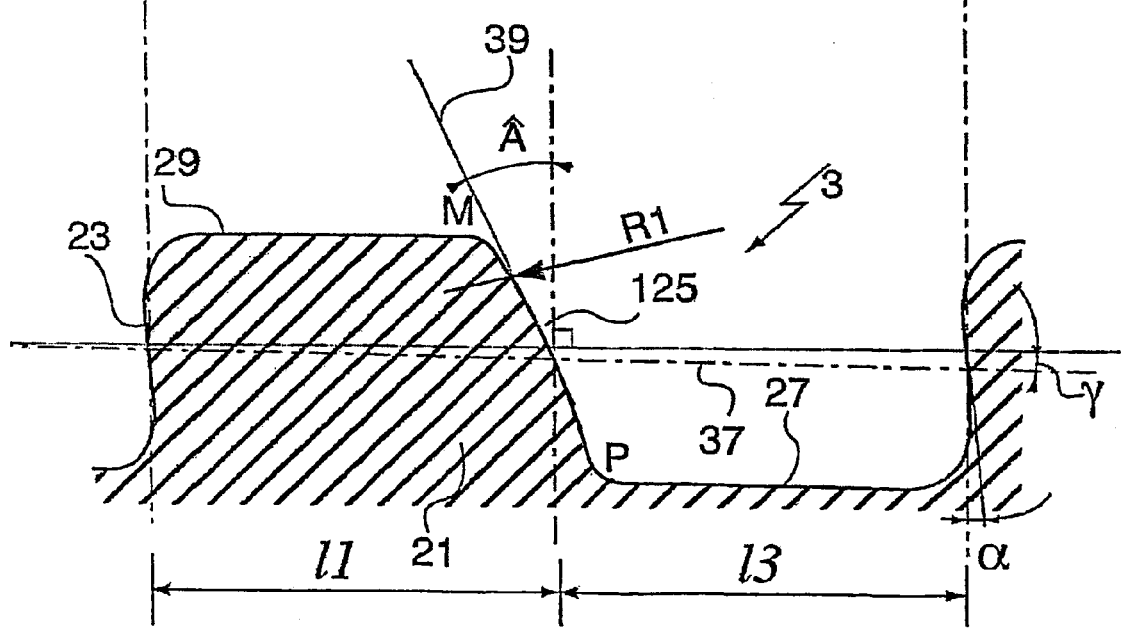
Figure 5C:
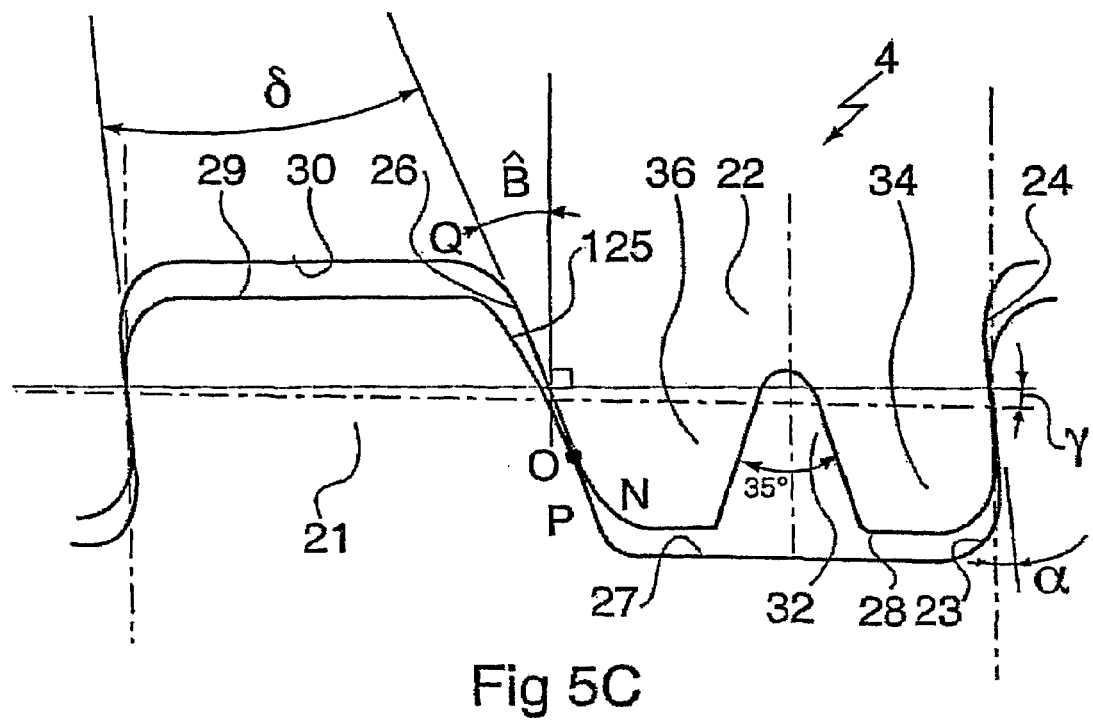
Figure 5D:
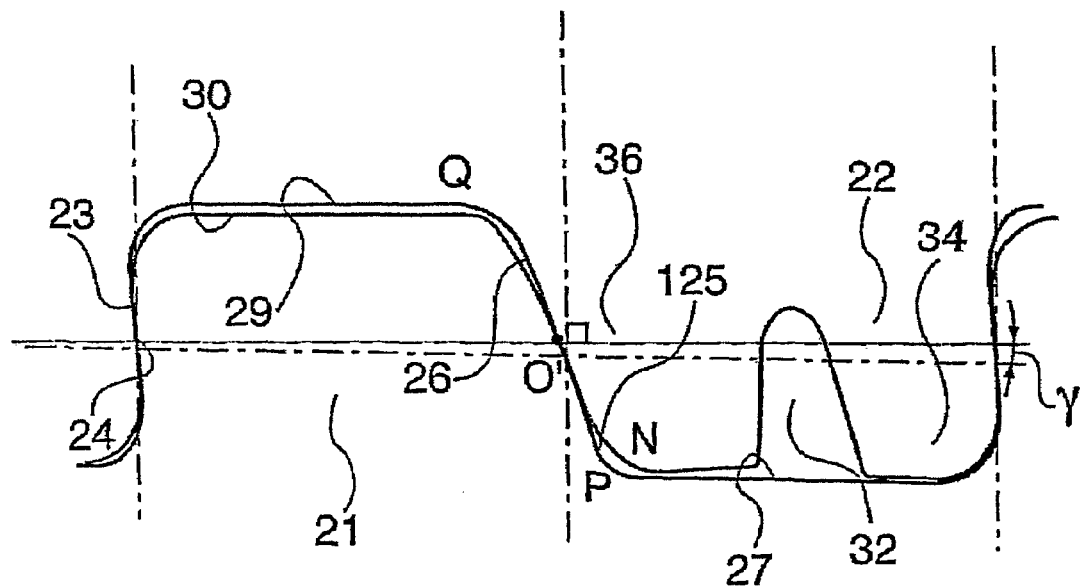

FIG. 4D illustrates the positioning of the threads when make-up is complete.

Portion 35 of the thread between groove 31 and flexible stabbing flank 125 has turned by a certain angle to allow adaptation of the bulk between male and female thread flanks.

The initial point of contact O is displaced to O' in the direction of the point P along arc MP.

Such a displacement OO' is beneficial as it means that the same point on the stabbing flanks is not constantly worked during make-up and thus limits the risks of galling.

It can thus be seen that there is an advantage in making the first contact at O over half the width of the arc MP opposite P and if possible near to the end M opposite P, i.e., on the side of the thread crest 29 where groove 31 is located.

The radius of curvature R1 of the convexly rounded flank 125 defines the displacement OO' for given angles A and B.

Figure 8:
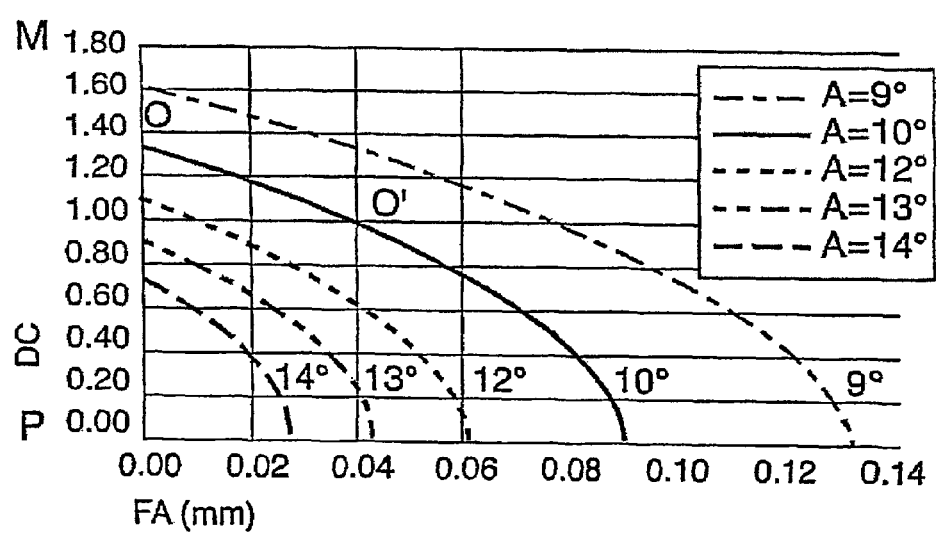
FIG. 8 is a graph representing the displacement of the interfering point of contact in the case of the threads of FIG. 4 as a function of make-up for different angular configurations of the stabbing flanks.
Figure 9:
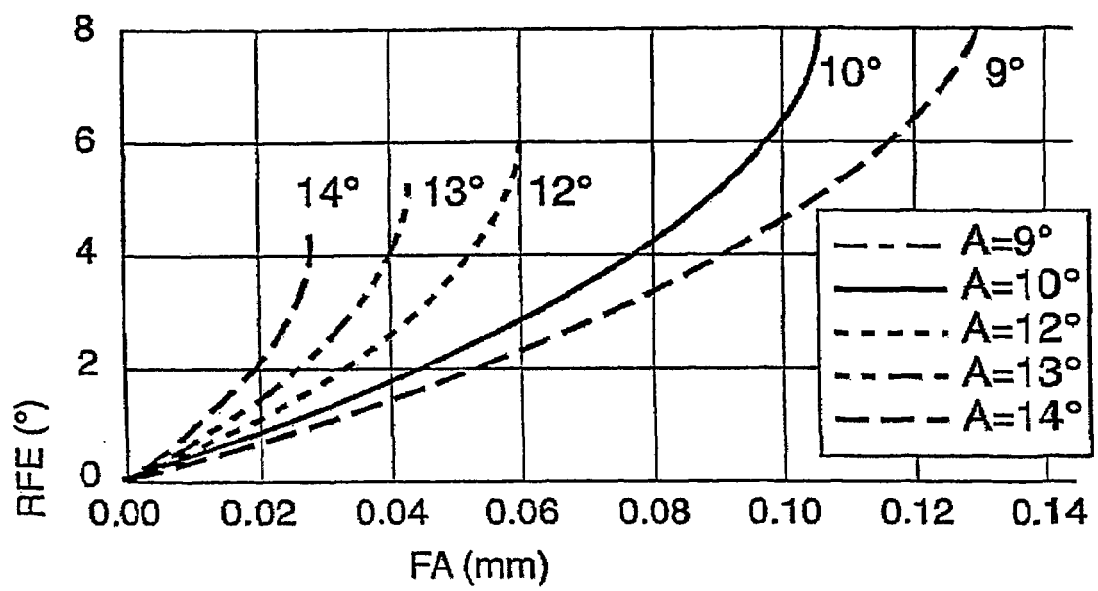
FIG. 9 is a graph showing the rotation of the flexible stabbing flank of FIG. 4 as a function of make-up for different angular configurations of the stabbing flanks.
Figure 10:
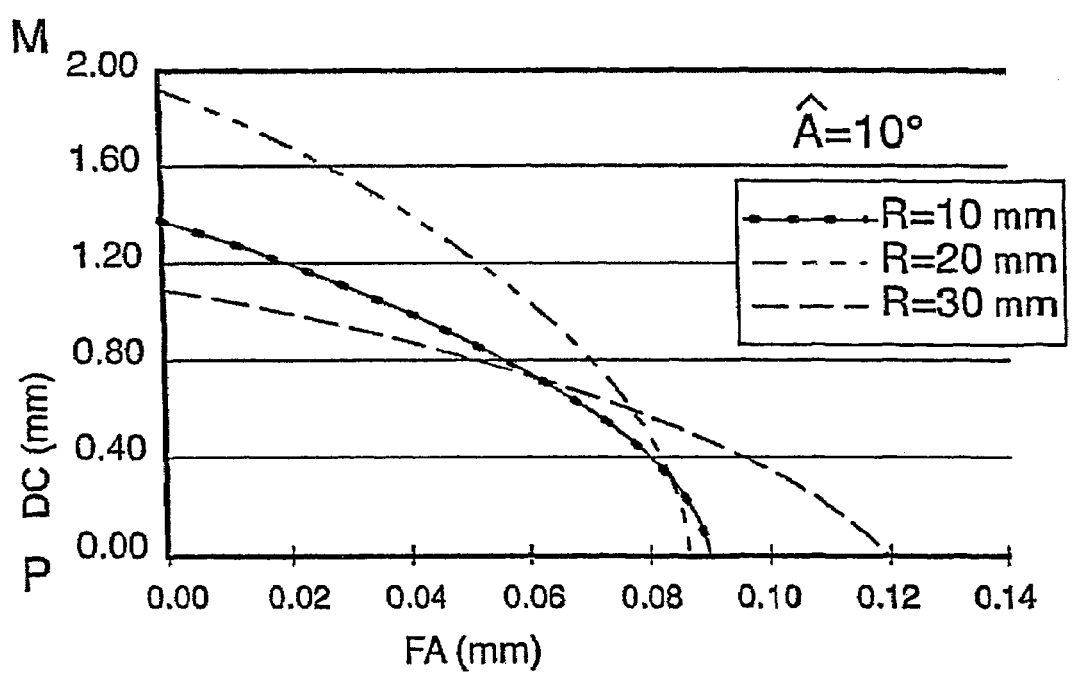
FIG. 10 is a graph showing the displacement of the interfering point of contact in the case of the threads of FIG. 4 as a function of make-up for different radii of curvature of the convexly rounded face.

The following graphs in FIGS. 8 to 10 result from studies on VAM TOP® type threaded connections (from VAM® catalogue n° 940, July 1994 from Vallourec Oil & Gas), modified in accordance with FIG. 4 and with the following characteristics:

low alloy steel pipes treated for grade L80 API (yield strength 552 MPa or more);
external pipe diameter: 177.8 mm (7");
pipe thickness: 10.36 mm (29 lb/ft);
threadings with a 6 mm pitch and taper=6.25% ($\gamma$=1.79°); thread height 1.8 mm; thread width 3.5 mm;
$\alpha$=−3°; B (angle of female stabbing flank)=13; $\delta$=10°;
A (mid-height male stabbing flank angle) between 9 and 14;
radius R1 of male convexly rounded stabbing flank varying between 5 and 20 mm;
grip (or axial interference) FA varying between 0 and 0.14 mm (0.04 mm target);
groove depth: 1 mm; width of groove at opening=1.4 mm; radius R2 at groove bottom=0.4 mm;
centre of groove bottom located 2.3 mm from load flank.

The graph in FIG. 8 shows the displacement DC of the contact point O along arc MP of the flexible flank 125 of FIG. 4 as a function of the grip FA of the stabbing flank for various values of angle A in the range 9 to 14.

FIG. 8 shows that the larger angle A becomes, the more rapidly flank 125 is displaced DC.

When angle A is less than angle B, it can be seen that the initial point of contact O is located on the half-width of arc MP on the side opposite the centre of rotation P.

Angle A cannot be lower than 9° as point O would then risk being outside arc MP beyond M.

Values of angle A of more than 12° are also not desirable as the final point of contact O' would be beyond P for certain poorly matched pairs of male-female threaded elements.

Further, using a point of contact O' close to P would also not appear to be optimal as it leads to stress concentrations at the root of the thread as in the case of contact between two rectilinear flanks.

A value of 10° for angle A appears to be quite suitable in the present case, the final point of contact O' leading to a stress peak at worst situated beyond the mid-width of the flank on the side of P.

FIG. 9 shows, for the same threaded connections, the development of the angle of rotation RFE of the flexible flank 125 as a function of grip FA.

Here again, the rotation of flank 125 is faster as angle A is increased.

It is important to select a relatively small angle A (10°) so as to limit the amplitude of the rotation with grip.

In this manner, the contact pressure will vary little as a function of the real grip obtained.

The graph shown in FIG. 10 shows, for the same type of thread connection, for various radii of curvature R1 of flank 125, the influence of the grip FA on the displacement DC of the point of contact, angle A being held constant and equal to 10°.

For a radius of curvature R1 of 20 mm, initial contact takes place at M and the point of contact rapidly displaces along the arc MP as grip is increased.

The lower the radius of curvature R1, the more the contact point O is displaced towards P and the lower the rate of displacement as a function of grip.

A radius R much lower than 5 mm, appears to be deleterious if it is desired to retain an initial point of contact O over the mid-width of arc MP opposite P.

It is thus convenient to select a radius of curvature R1 for the convexly rounded stabbing flank 125 of between 3 and 30 mm.

The same effect of increase in the strength of the threaded connection during breakout or overtorquing is obtained in the case of the threads of FIG. 4 as in the case of the threaded connections with convexly rounded thread crests as shown in FIG. 3 but the increase in this strength is much greater in the case of threads with axial interference with a convexly rounded stabbing flank than in the case of the threads of FIG. 3, the mechanism for the increase in this strength, however, being identical to that shown in FIG. 7.

The greatly improved strength was noted by makeup-breakout tests which were carried out using two threaded connections similar to those shown for the tests of FIGS. 8 to 10 but with distinctive geometric characteristics opposite to those of FIG. 4: the male threaded element is conventional with a male thread with rectilinear faces while the female threaded element comprises a female thread with a convexly rounded stabbing flank and a groove opening into the female thread crest.

For an angle between the tangent to the convexly rounded female stabbing flank and the normal to the axis of the connection (taken at the mid-height of the thread) of 11°, a radius R1 for the convexly rounded female stabbing flank of 10 mm and a grip of 0.02 mm, the breakout couple $T_b$ was raised for one of the threaded connections to 130% and for the other threaded connection to 123% of the make-up torque $T_f$.

FIG. 5 is a variation of FIG. 4. In FIG. 5, male thread 21 also has a convexly rounded stabbing flank 125 with an angle A at mid-width of the flank but does not possess a groove.

However, a groove 32 is provided on the female thread 22 and enables the rectilinear female stabbing flank 26 to bend, corresponding to the convexly rounded stabbing flank 125 in the interfering contact condition during make-up.

In the configuration of FIG. 5, angle A is higher than angle B. As can be seen in FIGS. 5C and 5D, such a configuration can allow first contact at O over the half-width of the flexible stabbing flank 26 on the side of the female thread crest 28 where groove 32 is located. This configuration also enables displacement OO' of the point of contact towards the centre of rotation Q.

Moreover the thread connection of FIG. 5 functions in a manner similar to that described in FIG. 4.

FIG. 6 shows the application to the threaded connection 300 of FIG. 2 of a thread with a groove and a convexly rounded stabbing flank on a straight threading with trapezoidal threads known as wedge threads or with variable width, such threadings with wedge threads being known, in particular, from U.S. Re 30,647.

Figure 6A:
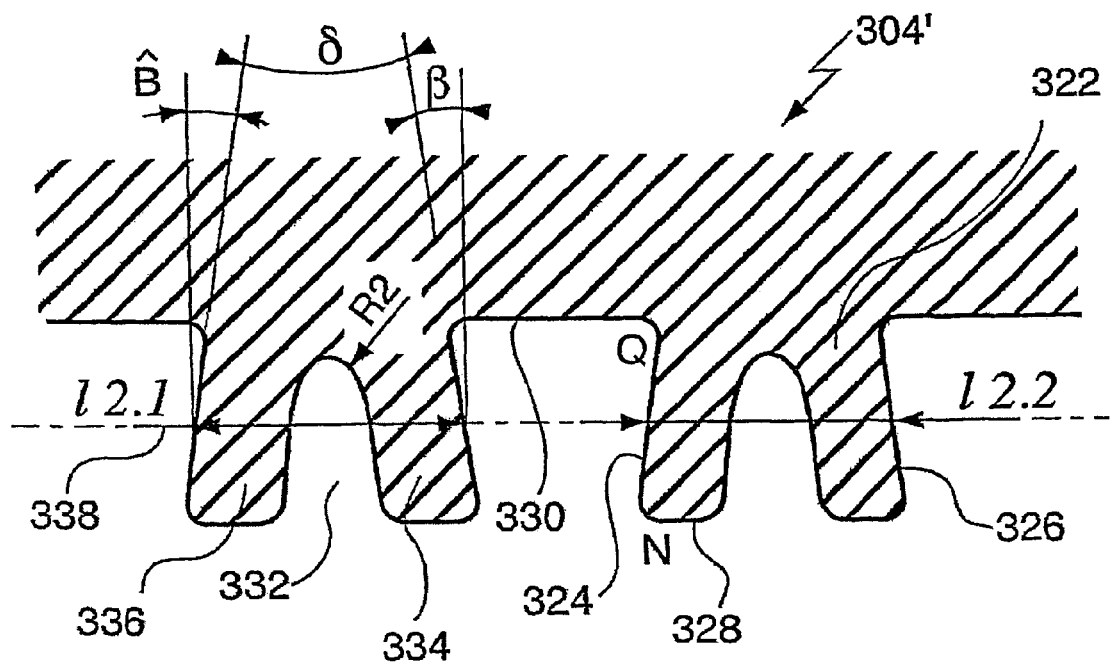
FIG. 6 shows a few threads of a further threaded connection of the invention, of the type shown in FIG. 2 with trapezoidal wedge threads with a varying width wherein the male load flank is convexly rounded.
Figure 6B:
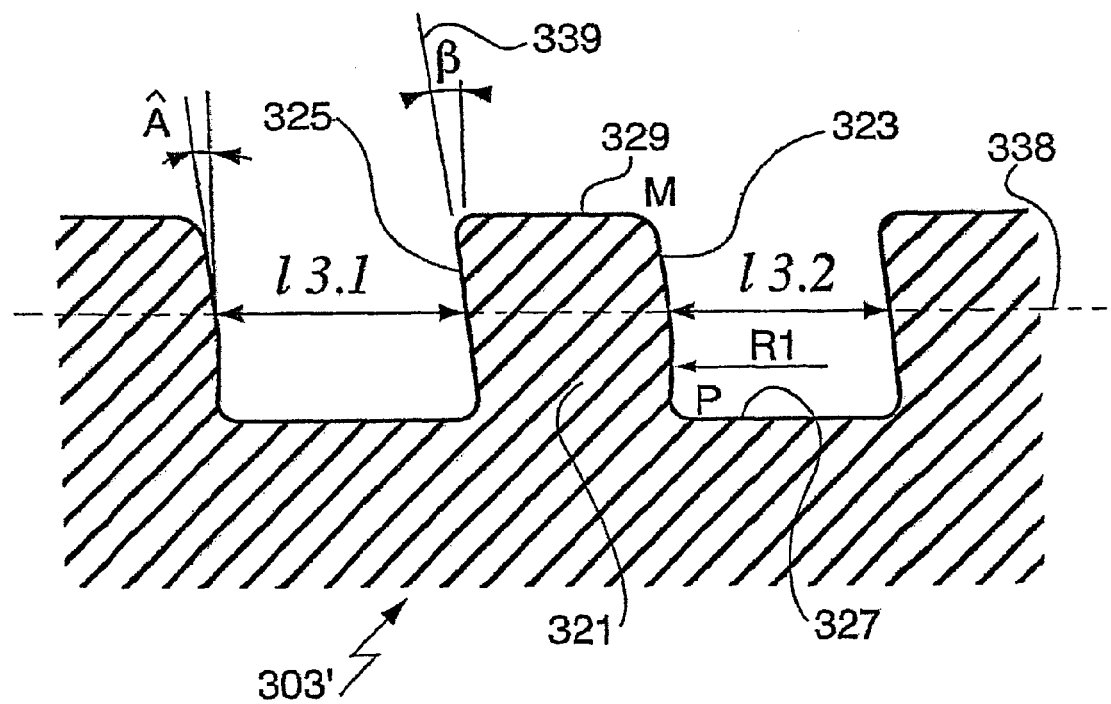

Male threading 303' of FIG. 6B comprises dovetail type trapezoidal threads with a variable width.

The male trapezoidal threads comprise:
- a rectilinear thread crest 329 parallel to the axis of the threaded connection;
- a thread root 327, also rectilinear and parallel to the axis of the threaded connection;
- a rectilinear stabbing flank 325 that overhangs the thread root 327; the angle β between the stabbing flank and the normal to the axis of the connection is thus negative;
- a convexly rounded load flank 323 with radius R1 (outside the junctions with the thread crests and roots).

Flank 323 is such that the tangent 339 at the mid-height of the thread makes an angle A with the normal to the axis of the connection.

Angles β and A are such that the threads are wider at their crest 329 than at the base (dovetail threads).

These threads have a constant pitch and variable width as the width of the thread increases (and as a result, the space between the thread teeth reduces) going away from the free end of the threaded element: thus l3.1 is larger than l3.2 in FIG. 7B.

The corresponding female threading 304' is shown in FIG. 6A.

Female threads 322 are of a known dovetail type with a variable width and mate with male threads 321.

The thread crests 328 and thread roots 330 are rectilinear and parallel to the axis of the connection.

The load 324 and stabbing 326 flanks are also rectilinear; they both overhang the thread roots 330 such that their respective angles B and β with respect to the normal to the axis of the connection are negative.

The half-height width l2 of the threads reduces gradually going towards the free end of the element such that l2.1 is larger than l2.2 in FIG. 6A.

Moreover the female threads 322 comprise, over their entire length, a helical groove 332 the profile of which has an axis which is substantially normal to the axis of the connection and which opens into thread crest 328.

This groove has a V profile with a rounded bottom with a radius R2 of 0.4 mm.

Figure 6C:
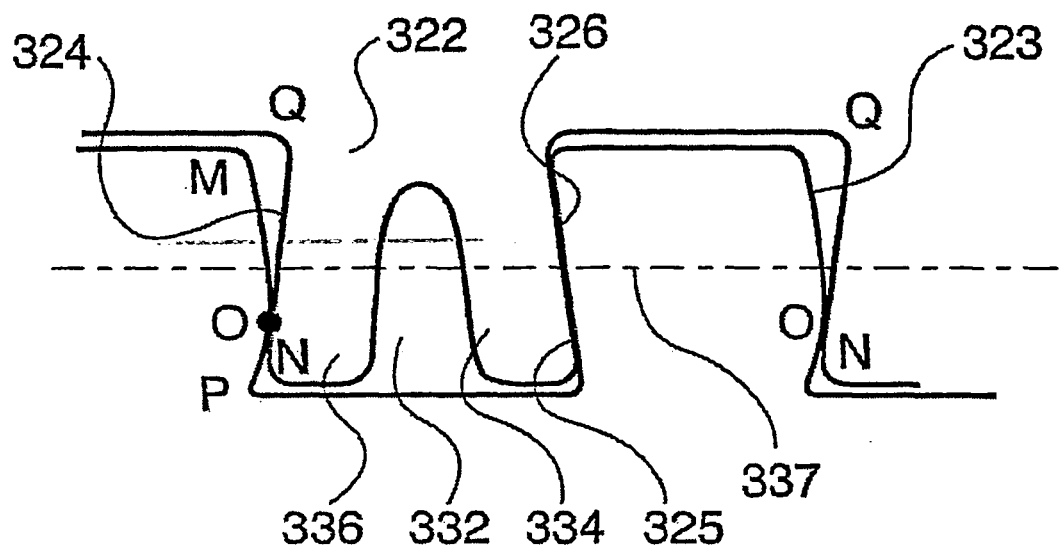
Figure 6D:
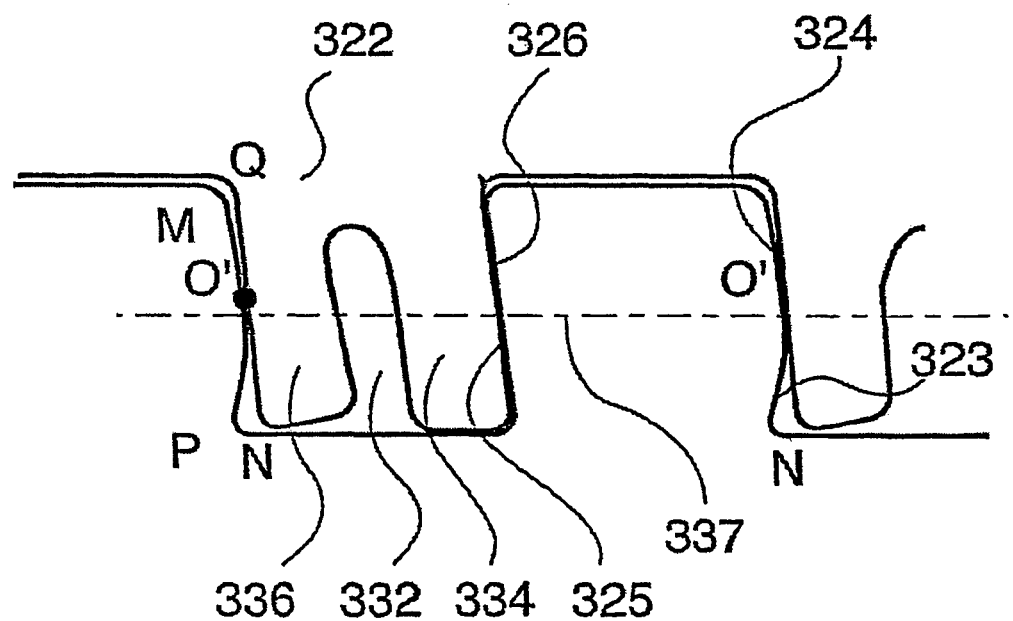

When threadings 303', 304' are made up one into the other, the low width threads are initially associated with the wider hollows but during making up, this clearance reduces until it becomes zero at a given moment shown in FIG. 6C: the male and female load flanks 323, 324 are in point contact at O and the male and female stabbing flanks 325, 326 are in distributed contact.

As shown in FIG. 5, point O is located on a segment NQ on the side of thread crest 328 where groove 332 is located.

As before, this originates from the fact than angle A is smaller than angle B in absolute value.

If make-up is continued beyond simple contact between the flanks, wider and wider threads are placed in ever narrower hollows: there is then wedging progressive axial interference between the flanks, hence the name "wedge" given to this type of threading; as in FIGS. 4 and 5, make-up can be continued only if the flanks are allowed to deform elastically.

The function of groove 332, advantageously assisted by the convexly rounded shape of load flank 323, is to allow such elastic deformation of the flanks.

The functions of groove 332 and convexly rounded flank 323 are similar to that of grooves 31, 32 and convexly rounded flank 125 of FIGS. 4 and 5, the flexible flank 324 being rectilinear as in FIG. 5.

It is convenient to select the radius of curvature R1 of the male load flank 323 to increase the resistance of the threaded connection to breakout or overtorquing by a mechanism identical to that described for FIG. 7.

It should be noted that the threaded connections of FIGS. 4 to 6 can also be adapted to wedge thread type tapered threadings with a variable width of the type disclosed in WO 94/29627. Such an adaptation is easy for the skilled person to perform in the light of the above indications.

The scope of the invention also encompasses other threaded tubular connections.

Thus, the scope of the invention encompasses a threaded tubular connection with axial interference as shown in FIG. 4 with radial interference between the crests of one of the male or female threads and the mating thread root at the end of make-up.

The scope of the invention also encompasses a threaded tubular connection with interfering tapered threadings wherein the male load flanks or the female load flanks are convexly rounded and wherein the male threads or female threads have a groove opening into the thread crest to accommodate variations in contact between the load flanks due to variable stresses of tension, compression or bending in service.

Such variations in contact are in fact susceptible, on solid threads (=without groove) having rectilinear load flanks, to induce the development of fatigue cracks (pitting) on said load flanks.

The different embodiments of the present invention, described or not described, are applicable both to integral threaded connections and to threaded and coupled connections.

Figure 11A:
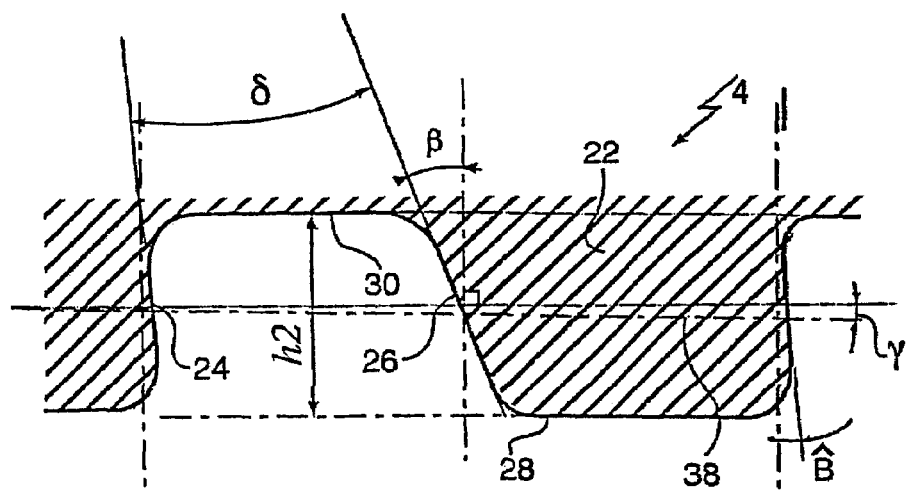
FIG. 11 shows a few threads of another threaded connection of the invention of the type shown in FIG. 1 with tapered threadings having interfering trapezoidal threads.
Figure 11B:
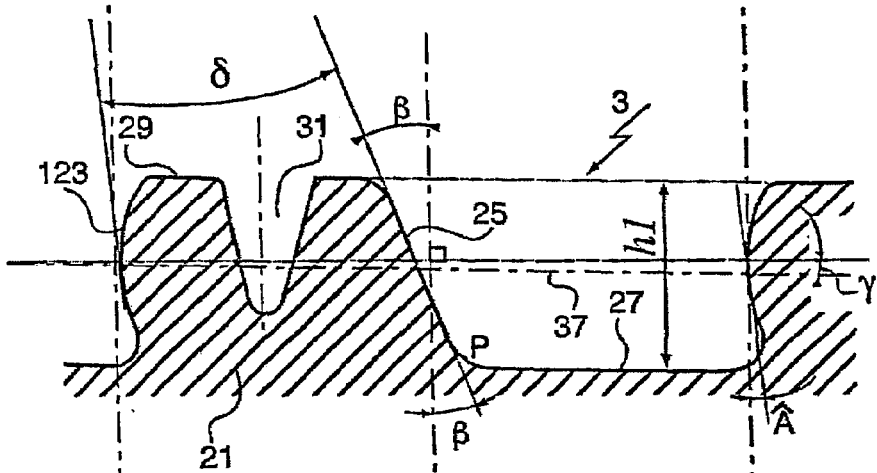
Figure 11C:
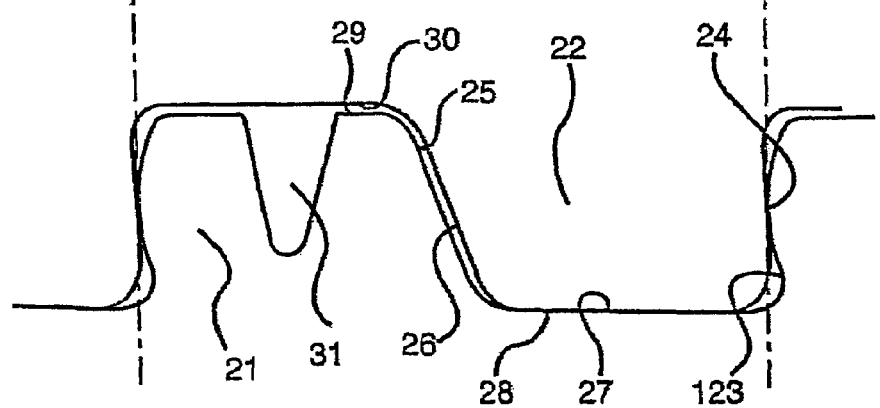

One can also produce a threaded tubular connection such as in FIG. 11, the trapezoidal female threads (FIG. 11A) of which have rectilinear faces whereas the corresponding male threads (FIG. 11B) also have a general trapezoidal shape but with a convex rounded load flank 123 as in FIG. 6B.

Height h1 of the male threads is slightly less than height h2 of the female threads and the width of the male or female threads is slightly less than the width of the clearances between the corresponding threads as in FIGS. 3A, 3B such that after making-up (FIG. 11C) the crests of the female threads 28 interfere radially with the roots of the male threads 27 whereas there exists a radial clearance between the crests of the male threads 29 and the roots of the female threads 30. Moreover the male load flanks 123 and the female load flanks 24 are in bearing contact whereas there exists an axial clearance between the male stabbing flanks 25 and the female stabbing flanks 26.

The female flanks 22 are solid whereas the male threads 21 have a groove 31 similar to that of FIG. 4, which enables to accommodate the variations of contact pressure in service.

The curvature of the male load flank 123 enables, in addition to the effects on strength during overtorquing and break-out, very advantageously, to control the width of the contact and the location of the contact between load flanks 123, 24 as indicated previously when the convex rounded face is a stabbing flank (see FIGS. 4 and 5).

Similar effects could be obtained making a rounded convex female load flank, the male load flank being rectilinear.

Similar effects could also be obtained on threaded connections with tapered threadings and threads termed "rugged threads" such as the ones described in documents EP 454 147 or JP 08,281 061 the male and female load flanks of which are in bearing contact whereas the male and female stabbing flanks are in contact at the end of make-up, the threads of at least one threading comprising a load flank or a stabbing flank or rounded convex load and stabbing flanks.

The invention claimed is:

1. A threaded tubular connection, comprising:
a male threaded element at an end of a first pipe and a female threaded element at an end of a second pipe,
the male threaded element comprising an external male threading with trapezoidal threads, the female threaded element comprising an internal female threading with trapezoidal threads,
the male and female threadings being made up one inside the other with a given make-up torque such that at least one male thread face is in contact pressure with a corresponding face of the female thread,
wherein, prior to contacting a corresponding face of the mating element, at least one thread face exhibits a continuous convexly rounded shape over at least a central part of a width of the at least one thread face, wherein the convexly rounded face is a load flank, and
wherein, after make up, said convexly rounded face is in point contact at said central part with said corresponding face of the mating element.

2. A threaded tubular connection according to claim 1, wherein the convexly rounded load flank is produced over the whole length of the threading under consideration.

3. A threaded tubular connection according to claim 1, wherein said convexly rounded load flank has a uniform curvature over a width of said convexly rounded load flank except for the junctions with the adjacent faces and over an entire length of the threading on which it is formed.

4. A threaded tubular connection according to claim 1, wherein one or other of the threads, male or female, comprises means for rendering flexible the convexly rounded flank or the flank corresponding thereto on the mating threading.

5. A threaded tubular connection according to claim 1, wherein said radii of curvature are in a range of 2 to 60 mm.

6. A threaded tubular connection according to claim 5, wherein said male trapezoidal threads extend over substantially a whole length of the male threading.

7. A threaded tubular connection according to claim 6, wherein said female trapezoidal threads extend over substantially a whole length of the female threading that mates with the male threading.

8. A threaded tubular connection according to claim 1, wherein said load flank is on an opposite side of a flank directed towards a free end of a threaded element with said convexly rounded face.

9. A threaded tubular connection according to claim 1, wherein said load flank is on said male threading.

10. A threaded tubular connection according to claim 1, wherein said load flank is on said female threading.

11. A threaded tubular connection according to claim 1, wherein said load flank is on each of said male and female threadings.

12. A threaded tubular connection, comprising:
a male threaded element at an end of a first pipe and a female threaded element at an end of a second pipe,
the male threaded element comprising an external male threading with trapezoidal threads, the female threaded element comprising an internal female threading with trapezoidal threads,
the male and female threadings being made up one inside the other with a given make-up torque such that at least one male thread face is in contact pressure with a corresponding face of the female thread,
wherein, prior to contacting a corresponding face of the mating element, at least one thread face exhibits a continuous convexly rounded shape over a width of the at least one thread face, said convexly rounded face having, over its width except for junctions with adjacent faces, one or more radii of curvature, wherein the convexly rounded face is a load flank,
wherein the convexly rounded load flank corresponds with a rectilinear load flank on a mating threading of the mating element, and
wherein, after make up, said convexly rounded face is in point contact with said correspondiun face of the matiun element.

13. A threaded tubular connection according to claim 12, comprising only one convexly rounded load flank disposed on only one of the two threadings.

14. A threaded tubular connection according to claim 12, wherein said convexly rounded shape is positioned over at least a central part of said width of the at least one thread face.

15. A threaded tubular connection comprising:
a male threaded element at an end of a first pipe and a female threaded element at an end of a second pipe,
the male threaded element comprising an external male threading with trapezoidal threads over substantially a whole length of the male threading, the female threaded element comprising an internal female threading with trapezoidal threads over substantially a whole length of the female threading that mates with the male threading,
the male and female threadings being made up one inside the other with a given make-up torque such that at least one male thread face is in contact pressure with a corresponding face of the female thread,
wherein, prior to make-up, at least one thread face exhibits a continuous convexly rounded shape over a width of the at least one thread face and wherein, after make up, said convexly rounded face is in point contact with a corresponding face of the mating element, said convexly rounded face having, over its width except for junctions with adjacent faces, one or more radii of curvature in a range of 2 to 60 mm,
wherein said convexly rounded face is a thread flank and wherein one or other of the threads, male or female, comprises means for rendering flexible the convexly rounded flank or the flank corresponding thereto on the mating threading,
wherein the means for rendering flexible the convexly rounded flank or the flank corresponding thereto comprises a groove disposed on the thread crest adjacent the flexible flank.

16. A threaded tubular connection according to claim 15, wherein a depth of the groove is less than or equal to a height of the thread in which it is formed.

17. A threaded tubular connection according to claim 15, wherein a width of an opening of the groove is less than or equal to ⅔ of a width of the thread in which it is formed, measured at mid-height thereof.

18. A threaded tubular connection according to claim 15, wherein a bottom of the groove is rounded with a radius of 0.2 mm or more.

19. A threaded tubular connection according to claim 15, wherein a first angle formed between a tangent to the convexly rounded flank at mid-height of said convexly rounded flank and a normal to an axis of connection is different from a second angle formed between a tangent to the flank corresponding to the convexly rounded flank on the mating thread.

20. A threaded tubular connection according to claim 19, wherein values of the first angle of the convexly rounded flank and the second angle of the corresponding flank are such that a first contact during make-up between the convexly rounded flank and the corresponding flank takes place on a side of the flexible flank directed towards the thread crest where the groove is located.

21. A threaded tubular connection according to claim 19, wherein a sign of an algebraic value of a difference between the first angle of the convexly rounded flank and the second angle of the corresponding flank is such that a point of contact between the convexly rounded flank and the corresponding flank is displaced towards a center of rotation of the flexible flank during makeup.

22. A threaded tubular connection according to claim 19, wherein a value of a difference between the first angle of the convexly rounded flank and the second angle of the corresponding flank is such that a final point of contact between the convexly rounded flank and the corresponding flank is located outside a quarter of a width of the flexible flank which is located at an end thereof on a thread root side.

23. A threaded tubular connection according to claim 19, wherein an absolute value of a difference between the first angle of the convexly rounded flank and the second angle of the corresponding flank is in a range of 1° to 5°.

24. A threaded tubular connection according to claim 15, wherein the convexly rounded flank is a load flank.

25. A threaded tubular connection according to claim 15, wherein the convexly rounded flank is a stabbing flank.

26. A threaded tubular connection according to claim 15, wherein the threaded connection is comprised of at least one of connections with radially interfering threads, with axially interfering threads, with wedge threads having a variable width.

27. A threaded tubular connection according to claim 15, wherein each male and female element comprises at least one sealing surface, each male sealing surface radially interfering with a corresponding female sealing surface on the threaded tubular connection in a made up position.

28. A threaded tubular connection according to claim 15, wherein each male and female element comprises at least one annular transverse abutment surface, at least one male abutment surface bearing against a corresponding female abutment surface on the threaded connection in a made up position.

29. A threaded tubular connection according to claim 15, wherein said convexly rounded shape is positioned over at least a central part of said width of the at least one thread face.

30. A method for obtaining a connection, comprising:
providing a male threaded element at an end of a first pipe and a female threaded element at an end of a second pipe, the male threaded element comprising an external male threading with trapezoidal threads over substantially a whole length of the male threading, the female threaded element comprising an internal female threading with trapezoidal threads over substantially a whole length of the female threading that mates with the male threading,
making up the male and female threadings one inside the other with a given make-up torque such that at least one male thread face is in contact pressure with a corresponding face of the female thread, and
applying a break-out torque up to 105% of the make-up torque while resisting a break out of the made-up connection,
wherein, prior to make-up, at least one thread face exhibits a continuous convexly rounded shape over a width of the at least one thread face and wherein, after make up, said convexly rounded face is in point contact with a corresponding face of the mating element, the convexly rounded face having, over its width except for junctions with adjacent faces, one or more radii of curvature in a range of 2 to 60 mm.

31. A method for obtaining a threaded tubular connection according to claim 30, wherein the convexly rounded face of a threading corresponds with a rectilinear face on the mating threading.

32. A method for obtaining a threaded tubular connection according to claim 30, comprising only one convexly rounded face disposed on only one of the two threadings.

33. A method for obtaining a threaded tubular connection according to claim 30, wherein the male and female threadings are tapered with threads that radially interfere with each other, and wherein the convexly rounded face is a thread crest.

34. A threaded tubular connection according to claim 30, wherein said convexly rounded shape is positioned over at least a central part of said width of the at least one thread face.

* * * * *